United States Patent
Monkiewicz et al.

(10) Patent No.: US 9,992,404 B2
(45) Date of Patent: Jun. 5, 2018

(54) METHOD AND SYSTEM FOR ADJUSTING CAMERA FOCUS TO FACILITATE INFRARED IMAGING

(71) Applicant: Avigilon Corporation, Vancouver (CA)

(72) Inventors: Christopher M. Monkiewicz, Vancouver (CA); Jamie Westell, Vancouver (CA); Sina Afrooze, Vancouver (CA)

(73) Assignee: Avigilon Corporation, Vancouver (CA)

( * ) Notice: Subject to any disclaimer, the term of this patent is extended or adjusted under 35 U.S.C. 154(b) by 278 days.

(21) Appl. No.: 14/866,379

(22) Filed: Sep. 25, 2015

(65) Prior Publication Data
US 2016/0094780 A1 Mar. 31, 2016

Related U.S. Application Data (60) Provisional application No. 62/055,601, filed on Sep. 25, 2014.

(51) Int. Cl.
| H04N 5/33 | (2006.01) |
| H04N 5/232 | (2006.01) |
| G03B 13/36 | (2006.01) |
| G03B 3/10 | (2006.01) |

(52) U.S. Cl.
CPC ........... *H04N 5/23212* (2013.01); *G03B 3/10* (2013.01); *G03B 13/36* (2013.01); *H04N 5/332* (2013.01)

(58) Field of Classification Search
CPC ...... H04N 5/23212; H04N 5/332; G03B 3/10; G03B 13/36
USPC ........................................................ 348/164
See application file for complete search history.

(56) References Cited

U.S. PATENT DOCUMENTS

| 3,748,383 | A | 7/1973 | Grossman | |
| 6,195,206 | B1 | 2/2001 | Yona et al. | |
| 7,933,507 | B2 | 4/2011 | Jelinek et al. | |
| 8,786,765 | B1 | 7/2014 | Yang et al. | |
| 8,982,272 | B1 * | 3/2015 | Preston | H04N 5/23212 348/333.03 |
| 8,994,845 | B2 | 3/2015 | Mankowski | |
| 9,091,903 | B2 | 7/2015 | Bunker et al. | |
| 2006/0140611 | A1 * | 6/2006 | Kuwakino | G02B 7/08 396/91 |

FOREIGN PATENT DOCUMENTS

DE 10028233 1/2002

OTHER PUBLICATIONS

International Search Report and Written Opinion for App. No. PCT/CA2015/050961, mailed by the Canadian Intellectual Property Office as ISA dated Dec. 4, 2015 (10 pages).

* cited by examiner

*Primary Examiner* — Sathyanaraya V Perungavoor
*Assistant Examiner* — Peet Dhillon (57) ABSTRACT

Methods, systems, and techniques for adjusting camera focus to facilitate infrared imaging are employed to account for a difference in wavelength between visible and infrared light to permit sharp imaging regardless of whether imaging is performed using visible or infrared light. Camera focus is adjusted in accordance with base and offset values. The base value may be determined in accordance with a curve relating focus motor position and object distance and the offset value may be manually set by the user or automatically set by performing an autofocus method when the camera is operating in low light conditions.

33 Claims, 9 Drawing Sheets

METHOD AND SYSTEM FOR ADJUSTING CAMERA FOCUS TO FACILITATE INFRARED IMAGING

TECHNICAL FIELD

The present disclosure is directed at methods, systems, and techniques for adjusting camera focus to facilitate infrared imaging.

BACKGROUND

A camera, such as a video camera used in a physical security system, may have the ability to operate in a "day mode" and a "night mode". When in day mode, an infrared cut-off filter ("IR cut filter") filters out infrared light from the light that is incident on the camera's imager; this results in the camera generating an image only from visible light. When visible light levels are low, the camera may be switched to night mode, which removes the IR cut filter from the path of the incident light. Consequently, the camera's imager is exposed to infrared light and to the remaining low levels of visible light. This facilitates generation of an infrared-light based image in conditions in which visible light levels may be insufficient to permit a good quality image to be generated.

Given the commercial benefits and flexibility of having a camera that is able to operate in day and night modes, research and development continue into methods, systems, and techniques for facilitating infrared imaging.

SUMMARY

According to a first aspect, there is provided a camera comprising a camera housing comprising an aperture to permit light to enter the camera housing; a lens located within the camera housing and positioned to refract the light entering the camera housing through the aperture; an imager located within the camera housing and positioned to receive the light that the lens refracts; a focus motor coupled to at least one of the lens and the imager and operable to adjust the focus of the camera by changing the position of the lens relative to the imager; a processor communicatively coupled to the focus motor; and a non-transitory computer readable medium communicatively coupled to the processor and having stored thereon computer program code that, when executed, causes the processor to perform a method comprising actuating the focus motor to adjust the focus of the camera to account for a difference in wavelength between visible and infrared light. The actuating comprises moving the focus motor to a position comprising a base value and an offset value.

The camera may further comprise an infrared cut-off filter ("IR cut filter") located within the camera housing and movable between a day position wherein the light that is incident on the imager passes through the IR cut filter and a night position wherein the light that is incident on the imager bypasses the IR cut filter. The method may further comprise moving the IR cut filter from the day position to the night position.

The lens may be a zoom lens and the camera may further comprise a zoom motor coupled to the zoom lens and operable to adjust the focal length of the zoom lens.

The base value may be determined in accordance with a curve of focus motor position vs. zoom motor position at an object distance, and the curve may be determined for a wavelength of infrared light.

The base value may be determined in accordance with a curve relating focus motor position and a wavelength of infrared light, and wherein the curve is determined for an object distance.

The camera may further comprise an infrared emitter configured to emit infrared light at the wavelength for which the curve is determined; and a current driver electrically coupled to the infrared emitter and to the processor, the processor causing the current driver to activate the infrared emitter when the IR cut filter is in the night position.

The method may further comprise applying an autofocus method to determine the base value.

The offset value may be entered by a user of the camera.

The method may further comprise sending, to a client terminal, a prompt requesting that a person specify the offset value; and receiving, from the client terminal, the offset value in response to the prompt, with the actuating comprising moving the focus motor to the base value and, after receiving the offset value from the client terminal, moving the focus motor by the offset value.

The prompt may comprise a slider that ranges from a minimum value to a maximum value. The minimum value may correspond to moving the focus motor by a certain percentage of the total range of the focus motor in one direction and the maximum value may correspond to moving the focus motor by the certain percentage of the total range of the focus motor in an opposite direction. Alternatively, the minimum value may correspond to moving the focus motor a certain percentage of the distance between a current focus motor position and a lower limit position of the focus motor and the maximum value may correspond to moving the focus motor by the certain percentage of the distance between the current focus motor position and an upper limit position of the focus motor.

The method may further comprise applying an autofocus method to determine the offset value.

According to another aspect, there is provided a system for adjusting camera focus to facilitate infrared imaging. The system comprises a client terminal; and a camera. The camera comprises a camera housing comprising an aperture to permit light to enter the camera housing; a lens located within the camera housing and positioned to refract the light entering the camera housing through the aperture; an imager located within the camera housing and positioned to receive the light that the lens refracts; a focus motor coupled to at least one of the lens and the imager and operable to adjust the focus of the camera by changing the position of the lens relative to the imager; a processor communicatively coupled to the focus motor; and a non-transitory computer readable medium communicatively coupled to the processor and having stored thereon computer program code that, when executed, causes the processor to perform a method comprising: actuating the focus motor to adjust the focus of the camera to account for a difference in wavelength between visible and infrared light, wherein the actuating comprises moving the focus motor to a position comprising a base value and an offset value; sending, to the client terminal, a prompt requesting that a person specify the offset value; and receiving, from the client terminal, the offset value in response to the prompt. The actuating comprises moving the focus motor to the base value and, after receiving the offset value from the client terminal, moving the focus motor by the offset value.

The camera may further comprise an IR cut filter located within the camera housing and movable between a day position wherein the light that is incident on the imager passes through the IR cut filter and a night position wherein the light that is incident on the imager bypasses the IR cut filter, and the method may further comprise moving the IR cut filter from the day position to the night position.

The lens may be a zoom lens and the camera may further comprise a zoom motor coupled to the zoom lens and operable to adjust the focal length of the zoom lens.

The base value may be determined in accordance with a curve of focus motor position vs. zoom motor position at an object distance, and the curve may be determined for a wavelength of infrared light.

The base value may be determined in accordance with a curve relating focus motor position and a wavelength of infrared light, and wherein the curve is determined for an object distance.

The camera may further comprises an infrared emitter configured to emit infrared light at the wavelength for which the curve is determined; and a current driver electrically coupled to the infrared emitter and to the processor, the processor causing the current driver to activate the infrared emitter when the IR cut filter is in the night position.

The method may further comprise applying an autofocus method to determine the base value.

The prompt may comprise a slider that ranges from a minimum value to a maximum value. The minimum value may correspond to moving the focus motor by a certain percentage of the total range of the focus motor in one direction and the maximum value may correspond to moving the focus motor by the certain percentage of the total range of the focus motor in an opposite direction. Alternatively, the minimum value may correspond to moving the focus motor a certain percentage of the distance between a current focus motor position and a lower limit position of the focus motor and the maximum value may correspond to moving the focus motor by the certain percentage of the distance between the current focus motor position and an upper limit position of the focus motor.

According to another aspect, there is provided a method for adjusting camera focus to facilitate infrared imaging, the method comprising actuating a focus motor of a camera to adjust the focus of the camera to account for a difference in wavelength between visible and infrared light, wherein the actuating comprises moving the focus motor to a position comprising a base value and an offset value.

The camera may further comprise an IR cut filter movable between a day position wherein the light that is incident on the imager passes through the IR cut filter and a night position wherein the light that is incident on the imager bypasses the IR cut filter, and the method may further comprise moving the IR cut filter from the day position to the night position.

The camera may comprise a zoom lens and a zoom motor coupled to the zoom lens that is operable to adjust the focal length of the zoom lens.

The base value may be determined in accordance with a curve of focus motor position vs. zoom motor position at an object distance, and the curve may be determined for a wavelength of infrared light.

The base value may be determined in accordance with a curve relating focus motor position and a wavelength of infrared light, and wherein the curve is determined for an object distance.

The camera may further comprise an infrared emitter configured to emit infrared light at the wavelength for which the curve is determined and a current driver electrically coupled to the infrared emitter and to the processor, and the method may further comprise activating the infrared emitter when the IR cut filter is in the night position.

The method may further comprise applying an autofocus method to determine the base value.

The offset value may be entered by a user of the camera.

The method may further comprise sending, to a client terminal, a prompt requesting that a person specify the offset value; and receiving, from the client terminal, the offset value in response to the prompt. The actuating may comprise moving the focus motor to the base value and, after receiving the offset value from the client terminal, moving the focus motor by the offset value.

The prompt may comprise a slider that ranges from a minimum value to a maximum value. The minimum value may correspond to moving the focus motor by a certain percentage of the total range of the focus motor in one direction and the maximum value may correspond to moving the focus motor by the certain percentage of the total range of the focus motor in an opposite direction. Alternatively, the minimum value may correspond to moving the focus motor a certain percentage of the distance between a current focus motor position and a lower limit position of the focus motor and the maximum value may correspond to moving the focus motor by the certain percentage of the distance between the current focus motor position and an upper limit position of the focus motor.

The method may further comprise applying an autofocus method to determine the offset value.

According to another aspect, there is provided a non-transitory computer readable medium having encoded thereon computer program code that, when executed, causes a processor to perform the method of any of the above aspects or suitable variations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Figure 3A:
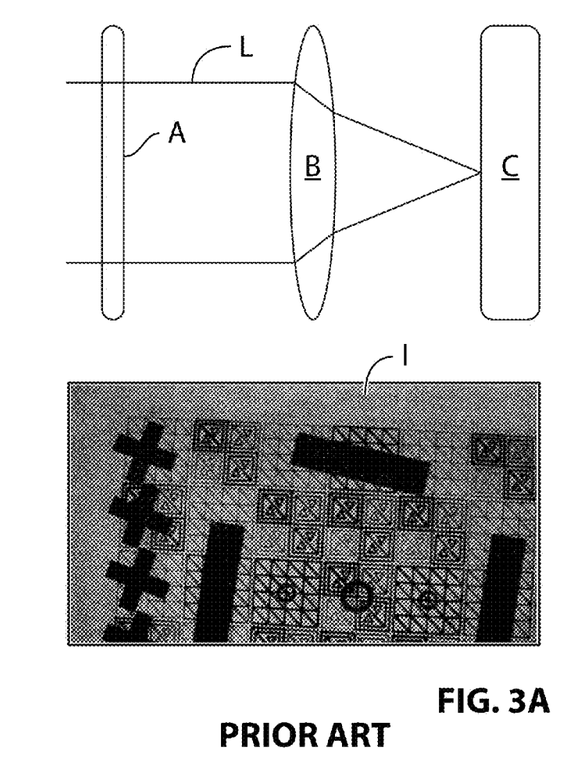
FIGS. 3A and 3B show ray diagrams and images generated using visible and infrared light, respectively, according to the prior art.
Figure 3B:
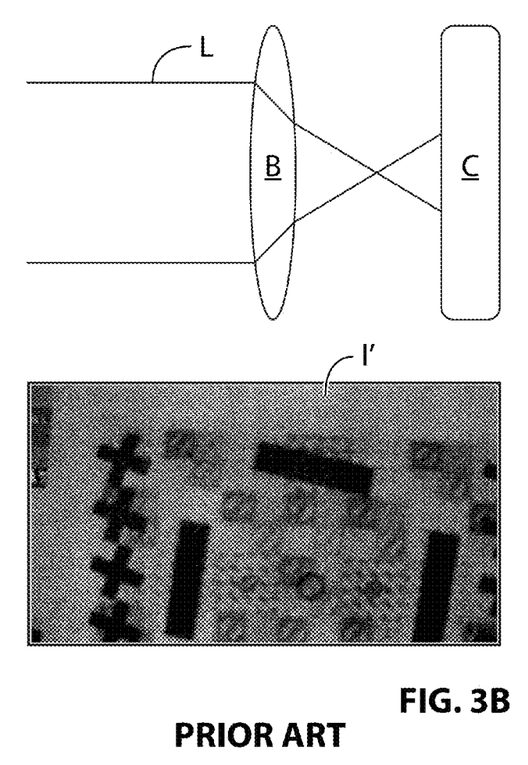

One example type of camera that comprises an on-board light source is a camera that is able to illuminate a region of interest using infrared ("IR") light and that is able to record and display the IR light that the region of interest reflects. This permits the camera to record images in darkness. However, for a camera that is able to image using IR light to also be useful during the day, the camera should also be able to image using visible light. As used herein, "IR light" refers to electromagnetic radiation having a wavelength of about 750 nm-about 1 mm and, more particularly, of about 750 nm-about 1,000 nm. Example wavelengths of IR light used particularly for imaging include about 850 nm and about 950 nm. While the wavelengths of "visible light" can vary, one industry accepted definition of "visible light" is electromagnetic radiation having a wavelength of about 400 nm-about 750 nm. As shown in FIGS. 3A and 3B, this can pose issues for conventional cameras. FIG. 3A shows a ray diagram comprising a prior art infrared cut-off filter A ("IR cut filter A"), focusing lens B, and imager C, which comprise part of a prior art camera (not shown). The assembly of FIG. 3A may be used when the camera is being used to generate an image using visible light. The IR cut filter A filters IR light from incident light L, which is refracted by the focusing lens B such that the focal point of the lens is on the surface of the imager C. This results in generation of a sharp image I. FIG. 3B shows the same assembly of FIG. 3A except that the IR cut filter A has been removed so that the incident light L bypasses the IR cut filter A; this may be done when the camera is being used to generate an image using IR light when visible light intensity is low. Because of the difference in wavelengths between visible and IR light, however, the focusing lens B focuses the incident light L at a focal point located ahead of the imager C, resulting in generation of a blurry image I'. While some conventional cameras attempt to compensate for IR light's shorter focal distance based on the theoretical change in focal length that corresponds to the difference between visible and IR light, in practice factors such as manufacturing variability between lenses renders that type of solution non-ideal.

In at least some of the embodiments described herein, camera focus is adjusted in response to a change from a camera's "day mode", in which the camera images based on visible light, to a camera's "night mode", in which the camera images based on IR light. The change in focus is effected by actuating a focus motor mechanically coupled to the camera's lens, which moves at least a portion of the lens relative to the camera's imager and allows the lens's focal point to remain on the imager's surface. The amount the focus motor is moved is determined based on a "base value" and an "offset value", with the base value determined using data provided by the lens manufacturer and the offset value being input by a user of the camera in response to real-time feedback from the camera. Requesting and applying the offset value when adjusting camera focus allows camera focus to be customized on a per-camera basis.

Figure 1:
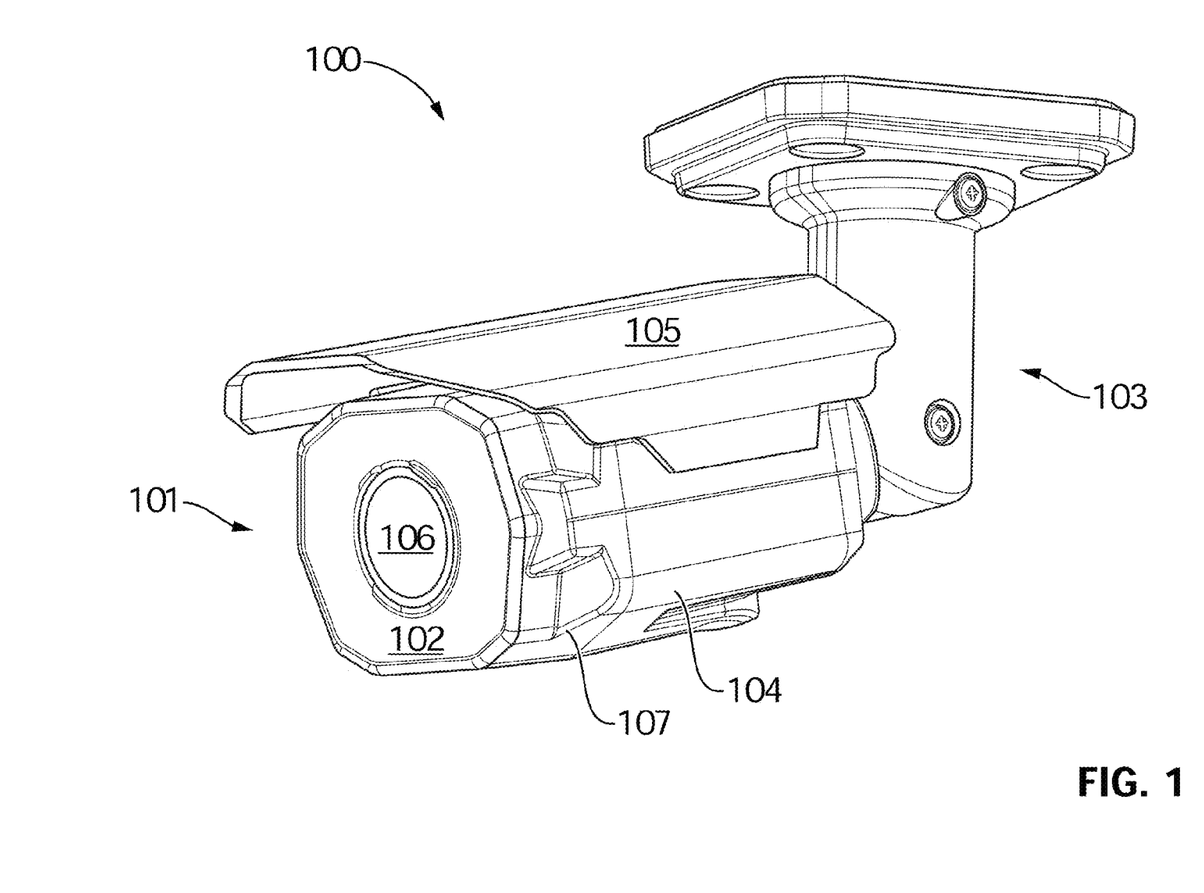
FIG. 1 is a perspective view of a camera assembly comprising a security camera and a mounting arm, according to one embodiment.

Referring now to FIG. 1, there is shown a camera assembly 100 according to a first embodiment. The camera assembly 100 comprises a security camera 101 movably coupled to a mounting arm 103, which is mountable to a mounting surface such as a ceiling or wall (not shown). The camera assembly 100 also comprises a sun shroud 105 slidably coupled to the top of the camera 101. Additionally, while the camera 101 in FIG. 1 is a bullet camera, alternative embodiments (not depicted) may comprise a different type of camera, such as a dome camera.

The camera 101 itself comprises a camera housing 104 comprising a housing wall that demarcates the interior of the camera 101 from the camera's 101 environment. A front portion 107 of the camera housing 104 comprises, at its front, a substantially flat face on which is overlaid a tinted window 102; the tinted window 102 hides the on-camera light source, as discussed in more detail below. At the center of the face is an optical aperture 106 through which light from the environment enters the camera housing 104.

Figure 2:
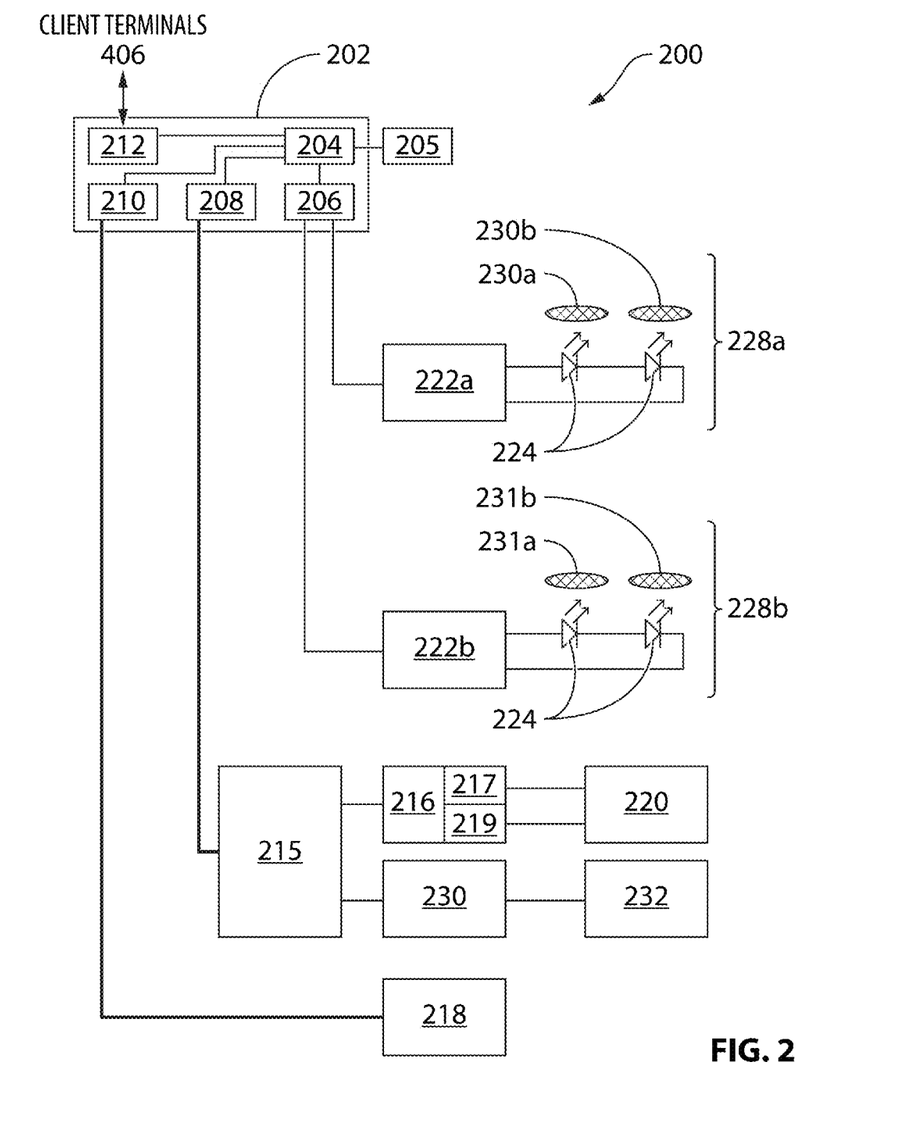
FIG. 2 is a block diagram of an imaging apparatus that comprises part of the security camera of FIG. 1.

Referring now to FIG. 2, there is shown a block diagram of an imaging apparatus 200 that also comprises part of the camera 101 and that is contained within the camera housing 104. The imaging apparatus 200 comprises a system on a chip 202 (hereinafter "SoC 202"), which includes a processor 204 that is communicatively coupled to each of the SoC's 202 other components: an image signal processor 210, a media access controller 212, general purpose input/output (GPIO) lines 206, and an I²C interface 208. The processor 204 is also communicatively coupled to memory 205 that is external to the SoC 202. Encoded on to the memory 205 is program code that the processor 204 can execute to operate the camera 101. The media access controller 212 is used to send messages to and from various client terminals 406 (not shown in FIG. 2, but shown in FIG. 4), as discussed in more detail below.

The imaging apparatus 200 also comprises a microcontroller 215 communicatively coupled to the I²C interface 208; in this example embodiment, the microcontroller 215 is an Atmel™ AVR™ microcontroller. A lens driver 216 is communicatively coupled to at least one of the microcontroller's 215 GPIO lines. The lens driver 216 comprises a focus motor 217 and a zoom motor 219, each of which is mechanically coupled to a varifocal lens 220 ("zoom lens 220"). The zoom motor 219 changes the focal length of the zoom lens 220, which alters the camera's 101 field of view. The focus motor 217 alters the focal point of the zoom lens 220 by moving at least a portion of the zoom lens 220 relative to the imager 218; depending on the embodiment, one or both of the lens 220 and the imager 218 may be moved relative to the housing 104, for example, to adjust focus. The zoom motor 219 is movable between various positions with each position corresponding to a different focal length, and the focus motor 217 is movable between various positions with each position corresponding to a different focal point. As discussed in more detail below in respect of FIGS. 3A, 3B, 6A, and 6B, the processor 204 determines how to actuate the focus and zoom motors 217,219 with reference to a base value determined from curves of focus motor position vs. zoom motor position at various object distances and an offset value, which is user entered. While the depicted example embodiments use the zoom lens 220, in alternative embodiments (not depicted) the camera's 101 lens need not have a variable focal length; the camera's 101 lens may have a static focal length and field-of-view. In these alternative embodiments, the zoom motor 219 may accordingly be missing from the imaging apparatus 200.

The imaging apparatus 200 also comprises an imager 218 communicatively coupled to the image signal processor 210, an infrared cut-off filter actuator 230 ("IR cut filter actuator 230") communicatively coupled to at least one of the microcontroller's 215 GPIO lines, an infrared cut-off filter 232 ("IR cut filter 232") mechanically coupled to the IR cut filter actuator 230, and a pair of current drivers 222a,b (collectively, "current drivers 222") each electrically coupled to a different one of the GPIO lines 206. Each of a pair of IR emitters 228a,b (collectively, "IR emitters 228") is electrically coupled to a different one of the current drivers 222 and emits IR light when driven by the current drivers 222. One of the IR emitters 228 produces an IR beam having a wide angle linear profile (hereinafter "wide angle emitter 228a") while the other of the IR emitters 228 produces an IR beam having a narrow angle linear profile (hereinafter "narrow angle emitter 228b"). The imager 218 is configured to capture light in the infrared spectrum and can be, for example, a digital sensor such as a complementary metal-oxide-semiconductor ("CMOS") sensor. The specifications of the imager 218 and the zoom lens 220 can be selected based on an operator's requirements and performance expectations.

While FIG. 2 shows an embodiment with only a pair of the IR emitters 228, other embodiments (not depicted) can feature more than two of the IR emitters 228, any one or more of them producing an IR beam of a different linear profile, and which can be combined to produce an IR beam with a variable linear profile. Alternatively, other embodiments (not depicted) may feature only one of the IR emitters 228.

The zoom lens 220 is mounted at the front of the camera 101 and is positioned to refract the light that enters the camera housing 104 through the optical aperture 106. The imager 218 is also located within the camera housing 104 and is positioned behind the zoom lens 220 to receive the light that the zoom lens 220 refracts. The IR cut filter 232 is movable between a day position and a night position: when in the day position, the IR cut filter 232 is positioned between the zoom lens 220 and the imager 218 so that light that is incident on the imager 218 passes through the IR cut filter 232 and has had the infrared light filtered from it; when in the night position, the IR cut filter 232 is moved out of the path of the light incident on the imager 218 so that the incident light bypasses the IR cut filter 232. The processor 204 controls the IR cut filter's 232 position by signalling the IR cut filter actuator 230 via the I²C interface 208.

A printed circuit board ("PCB", not shown) is also mounted at the front of the camera 101 around the zoom lens 220; the wide angle IR emitter 228a and narrow angle IR emitter 228b are respectively mounted on this PCB and face the same direction as the zoom lens 220 and serve to illuminate the field of view of the zoom lens with infrared light. The IR emitters 228 are aligned such that illumination pattern produced by each of the IR emitters 228 is centred on the same location in the field of view, and more particularly, at the center of the field of view of the zoom lens 220. The imaging apparatus 200 can be electrically coupled to a power source such as a nearby electrical outlet (not shown) and is configured with a maximum power rating that defines the total available power that can be sent to the IR emitters 228.

Each of the IR emitters 228 in this embodiment respectively comprises a set of infrared emitting diodes 224 ("IREDs 224"), each of which acts as an on-camera light source. An example of these IREDs 224 are a pair of Osram™ SFH4715S IREDs. The wide angle emitter 228a further comprises a right wide angle lenslet 230a and a left wide angle lenslet 230b (collectively, "wide angle lenslets" 230) and the narrow angle emitter 228b analogously further comprises a right narrow angle lenslet 231a and a left narrow angle lenslet 231b (collectively, "narrow angle lenslets" 231). The wide angle lenslets 230 are configured to shape the IRED emission into an IR beam with a linear profile that is relatively widely dispersed, and the narrow angle lenslets 231 are configured to shape the IRED emission into an IR beam with a linear profile that is relatively narrowly dispersed. Examples of these lenslets 230,231 are those provided by Ledil Oy™ based in Finland.

The current drivers 222 are designed to regulate the current delivered to the IR emitters 228. The current drivers 222 can be controlled to deliver all available power to one or the other of the IR emitters 228, or to vary the power ratio between the two IR emitters 228. The current drivers 222 may each be, for example, the AL8805 Buck LED Driver by On Semiconductor™. This program code stored on the memory 205 includes instructions for sending a control signal from the SoC 202 along two of the GPIO lines 206 to the current drivers 222 to produce the IR beam.

Figure 4:
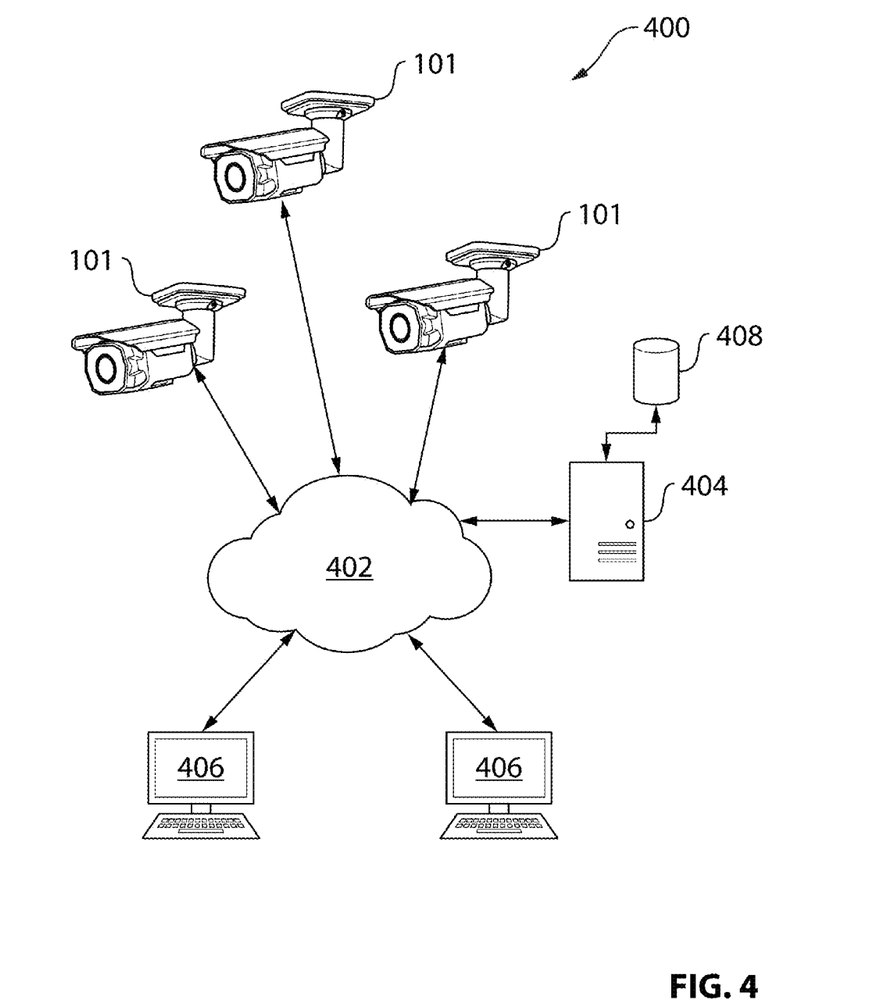
FIG. 4 shows a block diagram of a system for adjusting camera focus to facilitate infrared imaging, according to another embodiment.

Referring now to FIG. 4, there is shown an example system 400 for adjusting camera focus to facilitate infrared imaging, according to another embodiment. The system 400 comprises three cameras 101, a server 404, and a storage database 408 communicatively coupled to each other, and two client terminals 406. Each of the cameras 101, server 404, and terminals 406 is communicatively coupled to each other via an Ethernet-based local area network 402 ("LAN 402"). The server 404 and database 408 may be used, for example, to store video recordings or system parameters. Any one of the cameras 101 may communicate with any one of the client terminals 406; for example, in FIG. 4 each of the cameras 101 and client terminals 406 communicate by using HyperText Markup Language transmitted using the Hypertext Transfer Protocol. Each of the cameras 100 is capable of serving to the client terminals 406 a graphical user interface ("GUI") such as the GUI 500 of which a screenshot is shown in FIG. 5.

Figure 5:
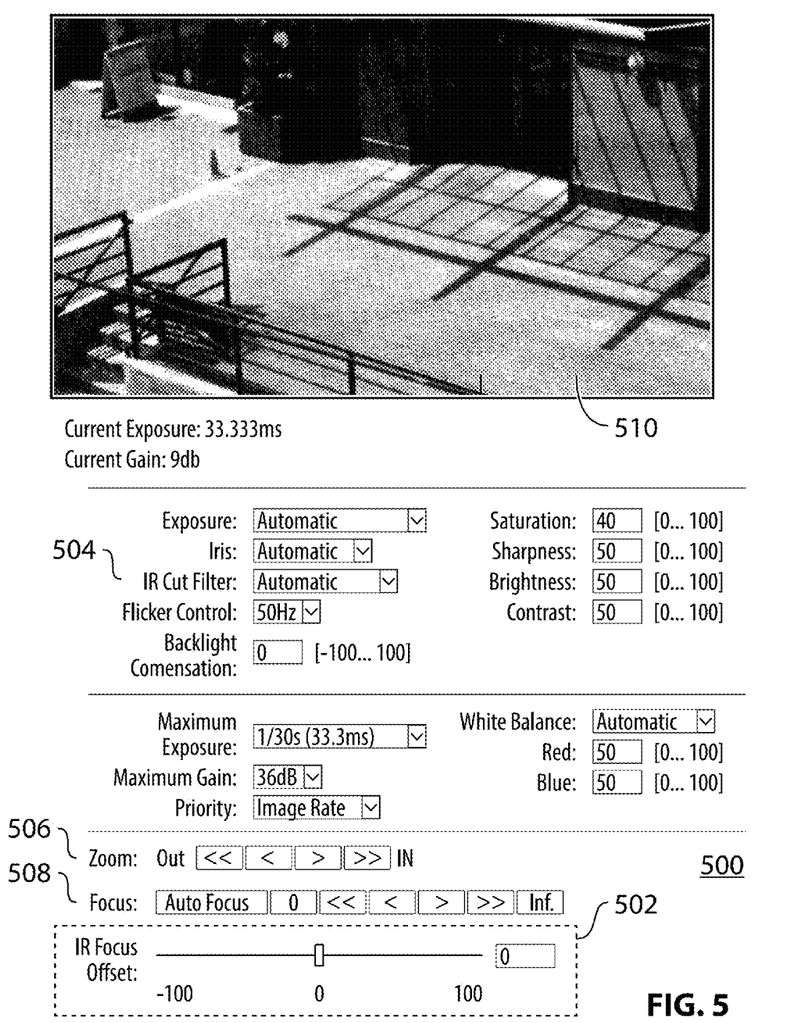
FIG. 5 shows a user interface displayed on a client terminal comprising part of the system of FIG. 4.

The GUI 500 of FIG. 5 presents to a user an image 510 generated by the camera 101 sending the GUI 500 to the client terminal 406 and a series of user controls; the controls include a setting 504 to control the IR cut filter 232 ("filter control 504"), zoom controls 506 that control the camera's 100 zoom motor 219, focus controls 508 that control the camera's 101 focus motor 217, and an "IR Focus Offset" slider 502 ("offset slider 502") that ranges from [−100,100].

The filter control 504 in FIG. 5 is set to "automatic". In automatic mode, the processor 204 detects using a luma (intensity) sensor whether the camera 101 is operating in daytime conditions, in which case the processor 204 automatically places the IR cut filter 232 in the day position, or in low-light or nighttime conditions, in which case the processor 204 automatically places the IR cut filter 232 in the night position. The filter control 504 may also be set to "manual", in which case the user controls whether the filter 232 is in the day position or the night position.

The zoom controls 506 permit the user to zoom the zoom lens 220 out or in; that is, to increase the camera's 101 field of view by decreasing the zoom lens's 220 focal length or to decrease the camera's 101 field of view by increasing the zoom lens's 220 focal length. Selecting the zoom controls 506 causes the processor 204 to actuate the camera's 101 zoom motor 219 if the zoom motor 219 is not at a limit position.

The focus controls 508 permit the user to focus the zoom lens 220 out or in; that is, to move the zoom lens 220 relative to the imager 218 so that objects that are located at longer object distances from the zoom lens 220 are in focus or so that objects that are located at shorter object distances from the zoom lens 220 are in focus. Selecting the focus controls 508 causes the processor 204 to actuate the camera's 101 focus motor 217 if the focus motor 217 is not at a limit position. The user may also instruct the camera 101 to autofocus itself, in which case the camera 101 applies any one of several known autofocus methods to automatically focus on an object within the camera's 101 field of view.

Figure 6A:
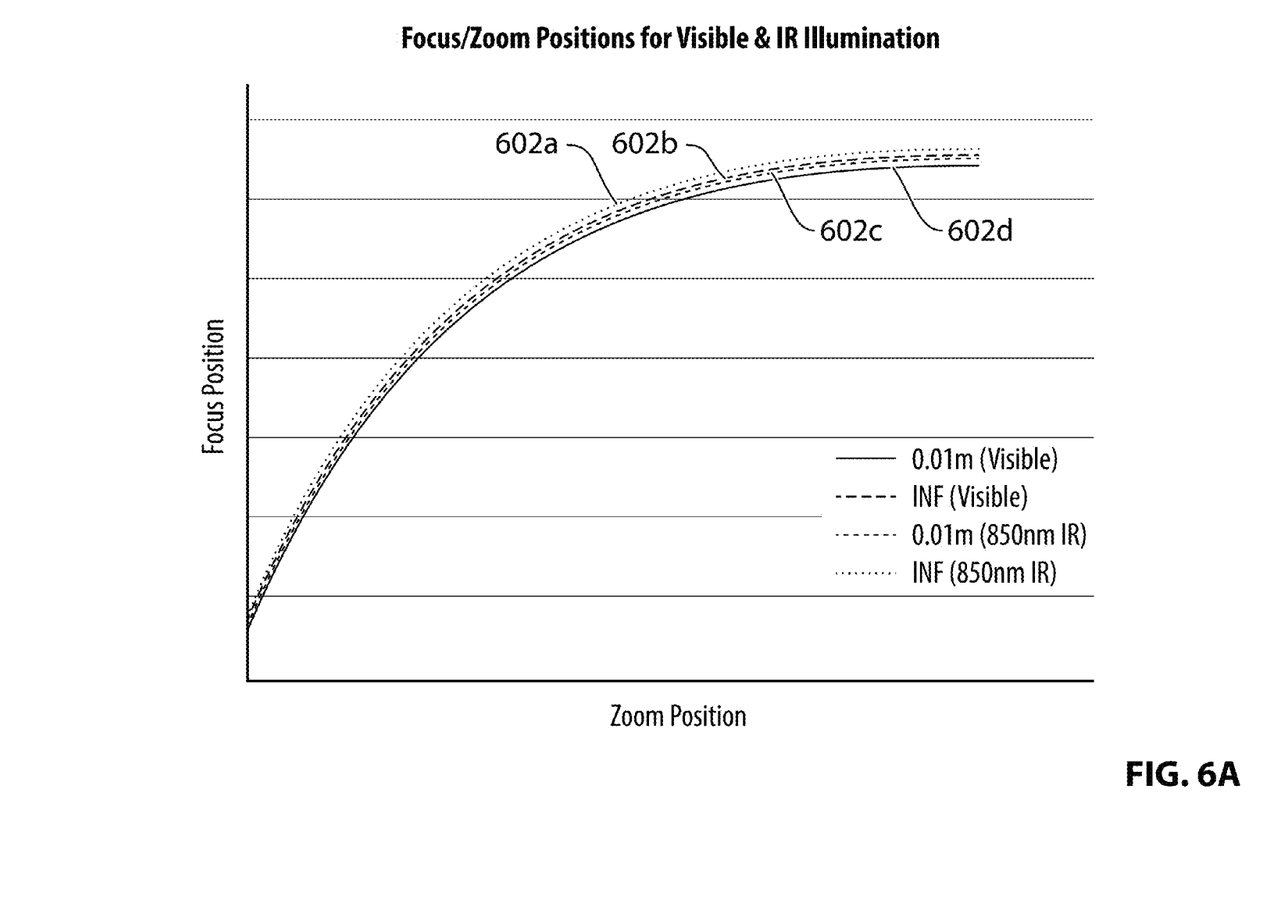
FIGS. 6A and 6B show curves of focus motor position vs. zoom motor position at various object distances and light wavelengths.
Figure 6B:
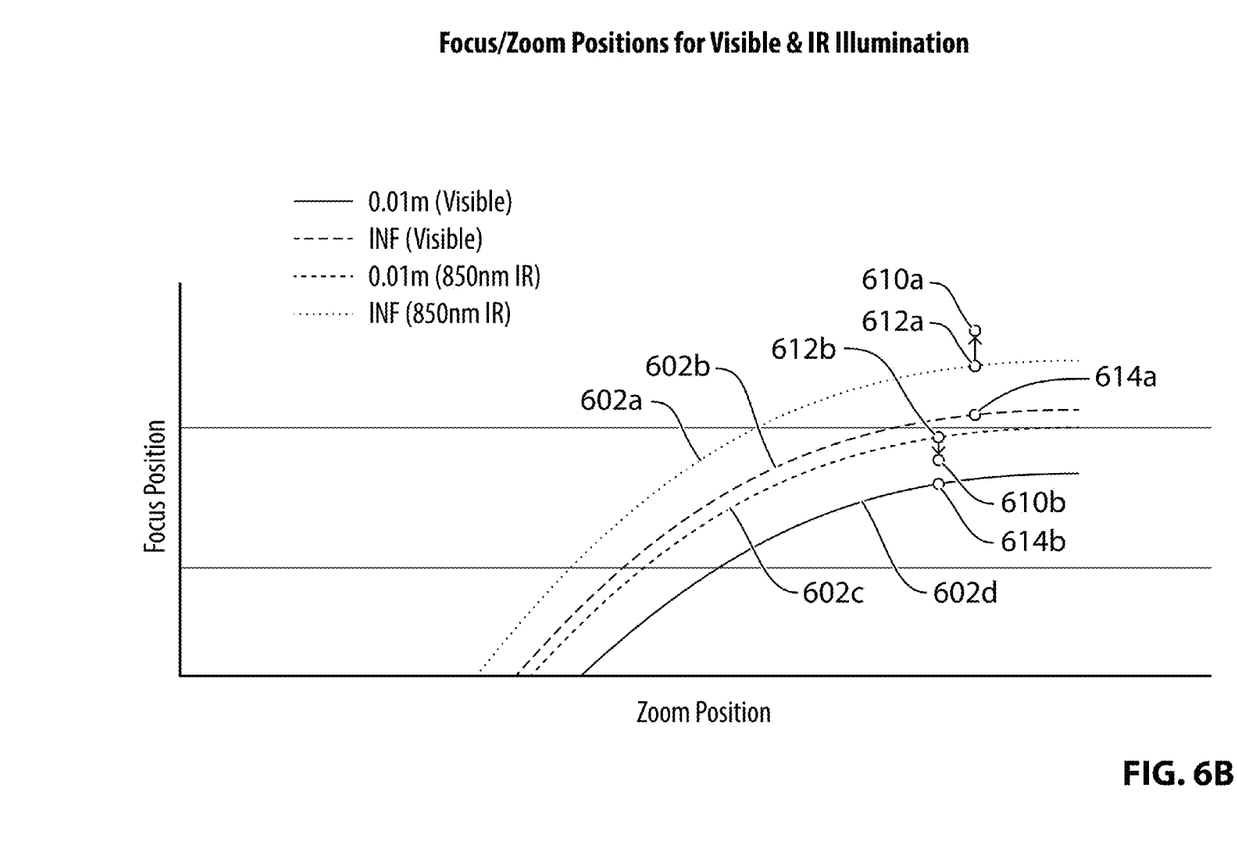

FIG. 6A shows a graph of four different curves 602a-d (collectively, "curves 602") of focus motor position vs. zoom motor position: a first curve 602a of an object imaged using 850 nm infrared light at an infinite object distance (hereinafter "infinite infrared curve 602a"); a second curve 602b of an object imaged using visible light at an infinite object distance (hereinafter "infinite visible curve 602b"); a third curve 602c of an object imaged using 850 nm infrared light at a 0.01 m object distance (hereinafter "0.01 m infrared curve 602c"); and a fourth curve 602d of an object imaged using visible light at a 0.01 m object distance (hereinafter "0.01 m visible curve 602d"). FIG. 6B shows a magnified view of a portion of the graph of FIG. 6A. The shape of the curves 602 may vary dramatically with the make and model of lens used; consequently, alternative curves (not depicted) may appear different from those of FIGS. 6A and 6B. For example, these alternative curves may show focus motor position decreasing as zoom motor position increases, or may not be monotonic.

The memory 205 stores a lookup table of various focus motor vs. zoom motor positions. More specifically, in the depicted embodiment the memory 205 stores a 2D array with one index of the array representing zoom position, another index of the array representing object distance, and the value of the array representing the focus motor position (in motor steps). While only four different curves 602 are shown, the memory 205 may have stored in it values that correspond to any number of curves 602, each of which corresponds to a particular object distance and wavelength of light used for imaging. The curves 602 and the corresponding entries for the lookup table are provided by the manufacturer of the zoom lens 220. For any given object distance and light wavelength, the curves 602 represent the zoom and focus motor positions that result in an object at the object distance being imaged in focus.

While in the depicted example embodiment the curves 602 are of zoom motor position vs. focus motor position at various wavelengths of light and object distances, in different embodiments (not depicted) alternative curves 602 are possible. As another example, in embodiments in which the lens 220 has a static focal length and field-of-view, the curves 602 may be of object distance vs. focus motor position, with different curves 602 corresponding to different wavelengths of light; additionally or alternatively, in embodiments in which the lens 220 has a static focal length and field-of-view, the curves 602 may be of wavelength of light vs. focus motor position, with different curves 602 corresponding to different object distances.

The focal length of the zoom lens 220 varies with the wavelength of the light used to generate an image, as evidenced by contrasting the infinite infrared and visible curves 602a,b and the 0.01 m infrared and visible curves 602c,d. When the camera 101 switches from day mode to night mode and the processor 204 accordingly moves the IR cut filter 232 from the day position to the night position, the processor 204 actuates the focus motor 217 with the goal of having objects that are in focus when imaged using visible light remain in focus when imaged using infrared light.

For example, referring to the infinite infrared and visible curves 602a,b, the camera 101 may be focused at an infinite object distance and the focus and zoom motors 217,219 may be at positions corresponding to a first day mode point 614a on the infinite visible curve 602b. When the camera 101 switches to night mode and the processor 204 moves the IR cut filter 232 to the night position, the processor 204 accesses the lookup table stored in the memory 205 and automatically adjusts the focus motor position so that the zoom and focus motor positions correspond to a first base night mode point 612a on the infinite infrared curve 602a. The position of the focus motor 217 at the first night mode point 612a is the "base value".

The infinite infrared curve 602a, however, may not accurately represent the characteristics of the zoom lens 220. For example, the lens manufacturer may base the infinite infrared curve 602a on ideal lens manufacturing conditions, when in reality lens-to-lens variability is introduced during manufacturing that makes the infinite infrared curve 602a only an approximation of the zoom lens's 220 behavior when infrared light is being used for imaging.

To address this, the user may specify an "offset value" by using the offset slider 502. If after the processor 204 adjusts the focus and zoom motor positions to those that correspond to the first base night mode point 612a and the object being focused on in the image 510 is blurry, the user can actuate the focus motor 217 by adjusting the offset slider 502. In FIG. 6B, the user actuates the offset slider 502 until the object in the image 510 is clear; more specifically, the user moves the offset slider 502 to a positive value, which increases the focus motor position such that it corresponds to the position of the focus motor 217 at a first offset night mode point 610a. The difference between the base value and the position of the focus motor 217 at the first offset night mode point 610a is the "offset value". The processor 204 stores the offset value in the memory 205. When the camera 101 returns to day mode, the processor 204 moves the focus and zoom motor positions to those that correspond to the first day mode point 614a; subsequently, when the camera returns to night mode, the processor 204 moves the focus and zoom motor positions to those that correspond to the first offset night mode point 610a.

An analogous description applies to the 0.01 m infrared and visible curves 602c,d. With these curves 602c,d, during day mode the processor 204 positions the zoom and focus motors 219,217 at positions corresponding to the zoom and focus motor positions at a second day mode point 614b. Upon transitioning to night mode, the processor 204 moves the zoom and focus motors 219,217 to positions corresponding to those of a second base night mode point 612b; the focus motor position at the second base night mode point 612b is the "base value". The user is then able to manually adjust the focus motor position and moves the focus motor position to the position corresponding to that of a second offset night mode point 610b. In contrast to the example involving the infinite infrared and visible curves 602a,b, with the 0.01 m infrared and visible curves 602c,d the user moves the offset slider 502 to a negative value. The difference between the focus motor positions at the second base and offset night points 612*b*,610*b* is again the "offset value", which the processor 204 stores in the memory 205 for future use.

The relationship between movement of the offset slider 502 and change in focus motor position may take any one of several suitable forms. For example, in the depicted embodiment the offset slider 502 is used to select values ranging from [−100,100], with a value of 0 translating to no movement of the focus motor 217, a value of 100 translating to movement of one half the total range of the focus motor 217 in one direction, a value of −100 translating to movement of one half the total range of the focus motor in an opposite direction, and values selected from the intervals of (0,100) and (−100,0) being linearly interpolated from the focus motor positions that correspond to the offset slider 502 values of −100, 0, and 100. Alternatively, a value of 0 may translate to no movement of the focus motor 217, a value of 100 may translate to movement of one half the distance between the current focus motor position and its upper limit position, and a value of −100 may translate to movement of one half the distance between the current focus motor position and its lower limit position.

Figure 7:
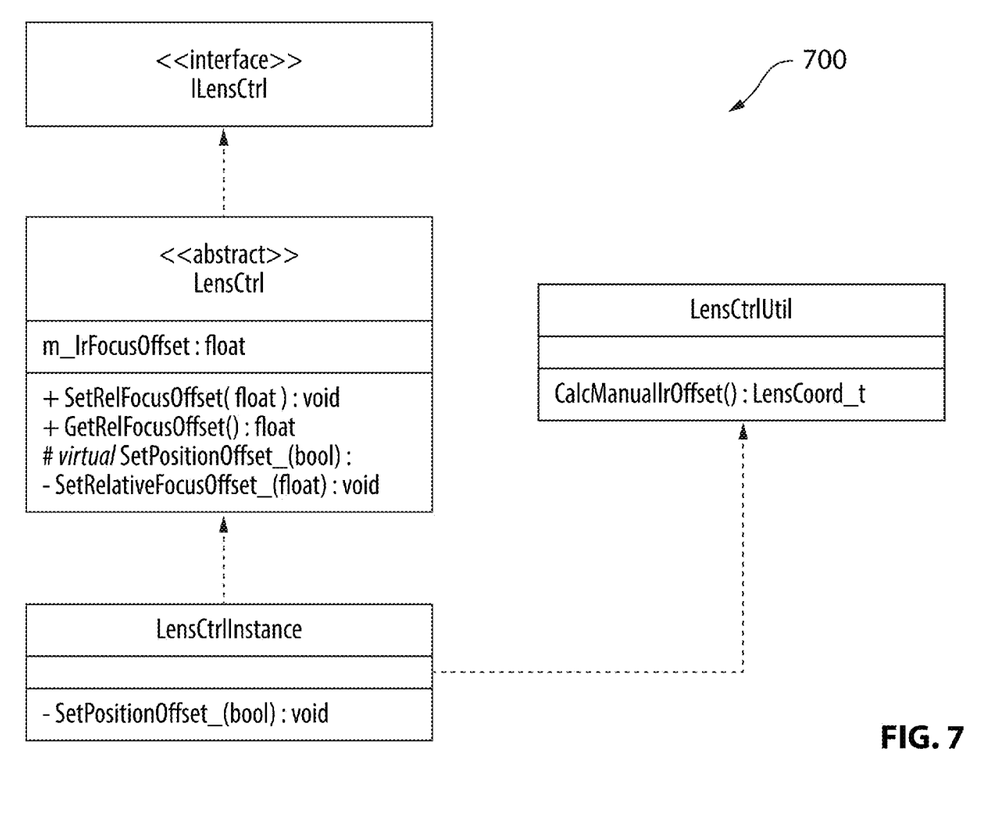
FIG. 7 is a class diagram of program code executable by a processor comprising part of the camera of FIG. 1.

Referring now to FIG. 7, there is shown a class diagram of object oriented program code stored in the memory 205 and executable by the processor 204. The class diagram shows how to implement the ILensCtrl interface. An abstract class LensCtrl comprises a variable m_IrFocusOffset used to store the current offset value and four methods: public method SetRelFocusOffset(float) used to set the offset value; public method GetRelFocusOffset( ) used to retrieve the offset value; protected virtual method SetPositionOffset_ (bool); and private method SetRelativeFocusOffset_(float) used to implement SetRelFocusOffset(float).

A LensCtrlInstance class implements the SetPositionOffset_(bool) method in the LensCtrl class, and uses a CalcManualIrOffset( ) method comprising part of a LensCtrlUtil class to translate the value the user enters using the offset slider 502 into a number of motor steps to be moved by the focus motor 217.

Figure 8:
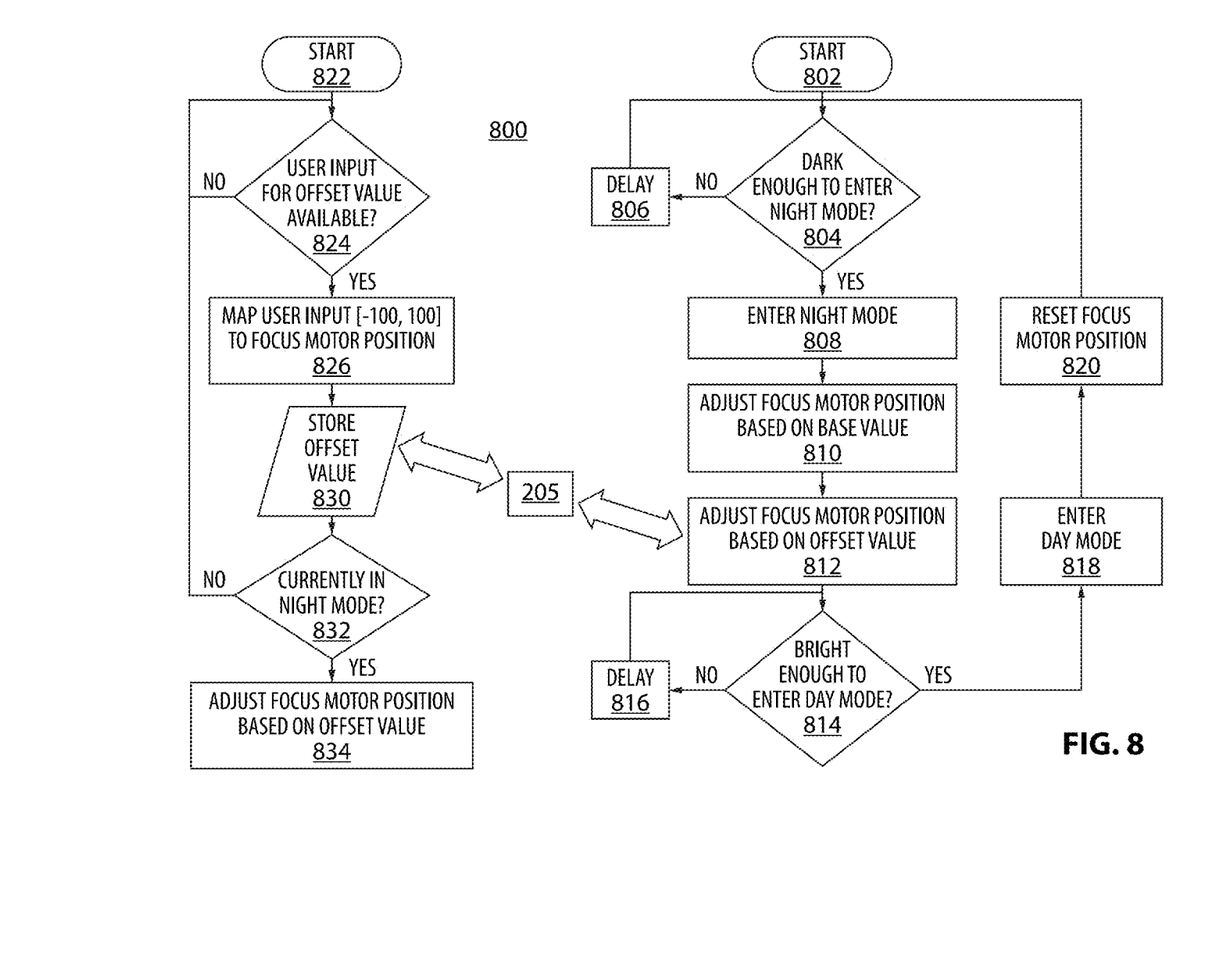
FIG. 8 shows a method for adjusting camera focus to facilitate infrared imaging, according to another embodiment.

Referring now to FIG. 8, there is shown a method 800 for adjusting camera focus to facilitate infrared imaging, according to another embodiment. The method 800 is implemented in accordance with the class diagram of FIG. 7 and stored as program code on the memory 205 for execution by the processor 204. Blocks 822, 824, 826, 830, 832, and 834 represent one branch of the method 800 that the processor 204 performs to retrieve the offset value that the user enters via the offset slider 502 and to update focus motor position when the camera 101 has already entered night mode. The remaining blocks of the method 800 represent another branch of the method 800 and are used to determine whether to enter night mode or day mode, and to set focus motor position upon entering the night mode. The processor 204 may perform these branches in parallel or sequentially.

The processor 204 begins one branch of the method 800 at block 802 and proceeds to block 804 where it determines whether it is dark enough to enter night mode by referencing the camera's 101 luma sensor. If it not dark enough to enter night mode, the processor 204 proceeds to a delay block 806, subsequently returns to block 804, and loops until it is dark enough to enter night mode. Once it is dark enough to enter night mode, the processor 204 proceeds to block 808 and enters night mode. Upon entering night mode at block 808 the processor 204 moves the IR cut filter 232 to the night position and begins encoding images in monochrome to reflect that infrared light is being used for imaging. The processor 204 then proceeds to block 810 where it adjusts the focus motor position in accordance with the base value that the processor 204 accesses from the memory 205 and that corresponds to the curves 602 provided by the lens manufacturer. The processor 204 adjusts the focus motor position by calling SetRelFocusOffset(float). The processor 204 then proceeds to block 812 where it further adjusts the focus motor position based on the offset value, which is stored in the memory 205; the processor 204 does this by again calling SetRelFocusOffset(float). After setting the focus motor position, the processor 204 proceeds to block 814 where it determines based on readings from the camera's 101 luma sensor whether it is bright enough to return to day mode. If no, the processor 204 proceeds to a delay block 816 and loops between blocks 814 and 816 until it is bright enough to enter day mode. Once it is bright enough, the processor 204 proceeds to block 818 where the processor 204 enters day mode and consequently moves the IR cut filter 232 to the day position and begins color image encoding again. The processor 204 proceeds to block 820 where it resets the focus motor's 217 position to correspond with the curves 602 for visible light, and then repeats this branch of the method 800 by proceeding to block 804.

The processor 204 begins the other branch of the method 800 at block 822 and proceeds to block 824. At block 824, the processor 204 determines whether the user has specified an offset value using the offset slider 502. If no, the processor 204 loops back to block 824 and awaits user input; if yes, the processor 204 proceeds to block 826 and translates the user input from [−100,100] to a particular focus motor position using CalcManualIrOffset( ). The processor 204 then stores the offset value returned using CalcManualIrOffset( ) at block 830 in the memory 205. After storing the offset value the processor 204 proceeds to block 832 where it determines whether the camera 101 is currently in night mode. If no, the processor 204 does not need to adjust the focus motor's 217 position and it consequently returns to block 824. If yes, the processor 204 proceeds to block 834 where it adjusts the focus motor position based on the offset value before returning to block 824. Because the processor 204 adjusts the focus motor's 217 position based on the base and offset values upon entering the night mode at blocks 810 and 812, the processor 204 only adjusts the focus motor position at block 834 if the user changes the offset value while the camera is in night mode.

In one alternative embodiment (not depicted), the offset slider 502 may be replaced with an IR autofocus button (not shown), in which the processor 204 applies an autofocus method to automatically focus the camera 101 once it has entered night mode. This autofocus can be used to determine the offset value automatically, with the processor 204 determining the base value from the appropriate curves 602 as described above. Alternatively, the processor 204 may use autofocus while in night mode to determine both the base and offset values, in which case the processor 204 can avoid reference to the curves 602 as discussed above in respect of FIGS. 6A and 6B.

While the camera 101 discussed above is able to emit and image using IR light, in some alternative embodiments (not depicted) the camera 101 does not comprise an on-board light source and relies instead on off-camera IR light sources to image using IR light. These off-camera IR sources may comprise, for example, standalone IR lamps or the subjects being recorded by the camera, such as IR emitting objects or people.

Furthermore, while the example embodiments above use the zoom lens 220, in alternative embodiments (not depicted) the camera's 101 lens may be a prime lens with a constant focal length. The processor 204 may nonetheless adjust the focus of the prime lens in response to whether the camera 101 is operating in day or night mode.

Additionally, while a single processor 204 and single memory 205 are shown in the example embodiments above, in alternative embodiments (not depicted) the processor 204 may be replaced with multiple processors 204 working independently or networked together to work in concert, and the memory 205 may be replaced with multiple memories 205 working independently or networked together to work in concert.

The processor 204 used in the foregoing embodiments may be, for example, a microprocessor, microcontroller, programmable logic controller, field programmable gate array, or an application-specific integrated circuit. Examples of the memory 205 are non-transitory computer readable media and include disc-based media such as CD-ROMs and DVDs, magnetic media such as hard drives and other forms of magnetic disk storage, semiconductor based media such as flash media, random access memory (including DRAM and SRAM), and read only memory.

It is contemplated that any part of any aspect or embodiment discussed in this specification can be implemented or combined with any part of any other aspect or embodiment discussed in this specification.

FIG. 8 is a flowchart of an example method. Some of the blocks illustrated in the flowchart may be performed in an order other than that which is described. Also, it should be appreciated that not all of the blocks described in the flowchart are required to be performed, that additional blocks may be added, and that some of the illustrated blocks may be substituted with other blocks.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A camera, comprising:
   (a) a camera housing comprising an aperture to permit light to enter the camera housing;
   (b) a lens located within the camera housing and positioned to refract the light entering the camera housing through the aperture;
   (c) an imager located within the camera housing and positioned to receive the light that the lens refracts;
   (d) a focus motor coupled to at least one of the lens and the imager and operable to adjust the focus of the camera by changing the position of the lens relative to the imager;
   (e) a processor communicatively coupled to the focus motor; and
   (f) a non-transitory computer readable medium communicatively coupled to the processor and having stored thereon computer program code that, when executed, causes the processor to perform a method comprising:
      (i) actuating the focus motor to adjust the focus of the camera to account for a difference in wavelength between visible and infrared light, wherein the actuating comprises moving the focus motor to a position comprising a base value and an offset value that is entered by a user of the camera;
      (ii) sending, to a client terminal, a prompt requesting that a person specify the offset value, wherein the prompt comprises a slider that is adjustable by the user and that ranges from a minimum value to a maximum value; and
      (iii) receiving, from the client terminal, the offset value in response to an adjustment of the slider, wherein the actuating comprises moving the focus motor to the base value and, after receiving the offset value from the client terminal, moving the focus motor by the offset value.

2. The camera of claim 1 further comprising an infrared cut-off filter ("IR cut filter") located within the camera housing and movable between a day position wherein the light that is incident on the imager passes through the IR cut filter and a night position wherein the light that is incident on the imager bypasses the IR cut filter, and wherein the method further comprises moving the IR cut filter from the day position to the night position.

3. The camera of claim 1 wherein the lens is a zoom lens and the camera further comprises a zoom motor coupled to the zoom lens and operable to adjust the focal length of the zoom lens.

4. The camera of claim 3 wherein the base value is determined in accordance with a curve of focus motor position vs. zoom motor position at an object distance, and wherein the curve is determined for a wavelength of infrared light.

5. The camera of claim 1 wherein the base value is determined in accordance with a curve relating focus motor position and a wavelength of infrared light, and wherein the curve is determined for an object distance.

6. The camera of claim 4 further comprising:
   (a) an infrared emitter configured to emit infrared light at the wavelength for which the curve is determined; and
   (b) a current driver electrically coupled to the infrared emitter and to the processor, wherein the processor causes the current driver to activate the infrared emitter when the IR cut filter is in the night position.

7. The camera of claim 1 wherein the method further comprises applying an autofocus method to determine the base value.

8. The camera of claim 1 wherein the minimum value corresponds to moving the focus motor by a certain percentage of the total range of the focus motor in one direction and the maximum value corresponds to moving the focus motor by the certain percentage of the total range of the focus motor in an opposite direction.

9. The camera of claim 1 wherein the minimum value corresponds to moving the focus motor a certain percentage of the distance between a current focus motor position and a lower limit position of the focus motor and the maximum value corresponds to moving the focus motor by the certain percentage of the distance between the current focus motor position and an upper limit position of the focus motor.

10. The camera of claim 1 wherein the method further comprises applying an autofocus method to determine the offset value.

11. A system for adjusting camera focus to facilitate infrared imaging, the system comprising:
   (a) a client terminal; and
   (b) a camera, comprising:

(i) a camera housing comprising an aperture to permit light to enter the camera housing;
(ii) a lens located within the camera housing and positioned to refract the light entering the camera housing through the aperture;
(iii) an imager located within the camera housing and positioned to receive the light that the lens refracts;
(iv) a focus motor coupled to at least one of the lens and the imager and operable to adjust the focus of the camera by changing the position of the lens relative to the imager;
(v) a processor communicatively coupled to the focus motor; and
(vi) a non-transitory computer readable medium communicatively coupled to the processor and having stored thereon computer program code that, when executed, causes the processor to perform a method comprising:
(1) actuating the focus motor to adjust the focus of the camera to account for a difference in wavelength between visible and infrared light, wherein the actuating comprises moving the focus motor to a position comprising a base value and an offset value;
(2) sending, to the client terminal, a prompt requesting that a person specify the offset value, wherein the prompt comprises a slider that is adjustable by the person and that ranges from a minimum value to a maximum value; and
(3) receiving, from the client terminal, the offset value in response to an adjustment of the slider, wherein the actuating comprises moving the focus motor to the base value and, after receiving the offset value from the client terminal, moving the focus motor by the offset value.

12. The system of claim 11 wherein the camera further comprises an infrared cut-off filter ("IR cut filter") located within the camera housing and movable between a day position wherein the light that is incident on the imager passes through the IR cut filter and a night position wherein the light that is incident on the imager bypasses the IR cut filter, and wherein the method further comprises moving the IR cut filter from the day position to the night position.

13. The system of claim 11 wherein the lens is a zoom lens and the camera further comprises a zoom motor coupled to the zoom lens and operable to adjust the focal length of the zoom lens.

14. The system of claim 13 wherein the base value is determined in accordance with a curve of focus motor position vs. zoom motor position at an object distance, and wherein the curve is determined for a wavelength of infrared light.

15. The system of claim 11 wherein the base value is determined in accordance with a curve relating focus motor position and a wavelength of infrared light, and wherein the curve is determined for an object distance.

16. The system of claim 13 wherein the camera further comprises:
(a) an infrared emitter configured to emit infrared light at the wavelength for which the curve is determined; and
(b) a current driver electrically coupled to the infrared emitter and to the processor, wherein the processor causes the current driver to activate the infrared emitter when the IR cut filter is in the night position.

17. The system of claim 11 wherein the method further comprises applying an autofocus method to determine the base value.

18. The system of claim 11 wherein the minimum value corresponds to moving the focus motor by a certain percentage of the total range of the focus motor in one direction and the maximum value corresponds to moving the focus motor by the certain percentage of the total range of the focus motor in an opposite direction.

19. The system of claim 11 wherein the minimum value corresponds to moving the focus motor a certain percentage of the distance between a current focus motor position and a lower limit position of the focus motor and the maximum value corresponds to moving the focus motor by the certain percentage of the distance between the current focus motor position and an upper limit position of the focus motor.

20. A method for adjusting camera focus to facilitate infrared imaging, the method comprising:
(a) actuating a focus motor of a camera to adjust the focus of the camera to account for a difference in wavelength between visible and infrared light, wherein the actuating comprises moving the focus motor to a position comprising a base value and an offset value that is entered by a user of the camera;
(b) sending, to a client terminal, a prompt requesting that a person specify the offset value, wherein the prompt comprises a slider that is adjustable by the user and that ranges from a minimum value to a maximum value; and
(c) receiving, from the client terminal, the offset value in response to an adjustment of the slider, wherein the actuating comprises moving the focus motor to the base value and, after receiving the offset value from the client terminal, moving the focus motor by the offset value.

21. The method of claim 20 wherein the camera further comprises an infrared cut-off filter ("IR cut filter") movable between a day position wherein the light that is incident on the imager passes through the IR cut filter and a night position wherein the light that is incident on the imager bypasses the IR cut filter, and wherein the method further comprises moving the IR cut filter from the day position to the night position.

22. The method of claim 20 wherein the camera comprises a zoom lens and a zoom motor coupled to the zoom lens that is operable to adjust the focal length of the zoom lens.

23. The method of claim 22 wherein the base value is determined in accordance with a curve of focus motor position vs. zoom motor position at an object distance, and wherein the curve is determined for a wavelength of infrared light.

24. The method of claim 20 wherein the base value is determined in accordance with a curve relating focus motor position and a wavelength of infrared light, and wherein the curve is determined for an object distance.

25. The method of claim 23 wherein the camera further comprises an infrared emitter configured to emit infrared light at the wavelength for which the curve is determined and a current driver electrically coupled to the infrared emitter and to the processor, and wherein the method further comprises activating the infrared emitter when the IR cut filter is in the night position.

26. The method of claim 20 further comprising applying an autofocus method to determine the base value.

27. The method of claim 20 wherein the minimum value corresponds to moving the focus motor by a certain percentage of the total range of the focus motor in one direction and the maximum value corresponds to moving the focus motor by the certain percentage of the total range of the focus motor in an opposite direction.

28. The method of claim 20 wherein the minimum value corresponds to moving the focus motor a certain percentage of the distance between a current focus motor position and a lower limit position of the focus motor and the maximum value corresponds to moving the focus motor by the certain percentage of the distance between the current focus motor position and an upper limit position of the focus motor.

29. The method of claim 20 further comprising applying an autofocus method to determine the offset value.

30. A non-transitory computer readable medium having encoded thereon computer program code that, when executed, causes a processor to perform the method of claim 20.

31. A camera, comprising:
(a) a camera housing comprising an aperture to permit light to enter the camera housing;
(b) a lens located within the camera housing and positioned to refract the light entering the camera housing through the aperture;
(c) an imager located within the camera housing and positioned to receive the light that the lens refracts;
(d) a focus motor coupled to at least one of the lens and the imager and operable to adjust the focus of the camera by changing the position of the lens relative to the imager;
(e) a processor communicatively coupled to the focus motor; and
(f) a non-transitory computer readable medium communicatively coupled to the processor and having stored thereon computer program code that, when executed, causes the processor to perform a method comprising actuating the focus motor to adjust the focus of the camera to account for a difference in wavelength between visible and infrared light, wherein the actuating comprises moving the focus motor to a position comprising a base value and an offset value, and wherein the base value is determined in accordance with a curve relating focus motor position and a wavelength of infrared light, and wherein the curve is determined for an object distance.

32. A system for adjusting camera focus to facilitate infrared imaging, the system comprising:
(a) a client terminal; and
(b) a camera, comprising:
(i) a camera housing comprising an aperture to permit light to enter the camera housing;
(ii) a lens located within the camera housing and positioned to refract the light entering the camera housing through the aperture;
(iii) an imager located within the camera housing and positioned to receive the light that the lens refracts;
(iv) a focus motor coupled to at least one of the lens and the imager and operable to adjust the focus of the camera by changing the position of the lens relative to the imager;
(v) a processor communicatively coupled to the focus motor; and
(vi) a non-transitory computer readable medium communicatively coupled to the processor and having stored thereon computer program code that, when executed, causes the processor to perform a method comprising:
(1) actuating the focus motor to adjust the focus of the camera to account for a difference in wavelength between visible and infrared light, wherein the actuating comprises moving the focus motor to a position comprising a base value and an offset value, and wherein the base value is determined in accordance with a curve relating focus motor position and a wavelength of infrared light, and wherein the curve is determined for an object distance;
(2) sending, to the client terminal, a prompt requesting that a person specify the offset value; and
(3) receiving, from the client terminal, the offset value in response to the prompt,
wherein the actuating comprises moving the focus motor to the base value and, after receiving the offset value from the client terminal, moving the focus motor by the offset value.

33. A method for adjusting camera focus to facilitate infrared imaging, the method comprising actuating a focus motor of a camera to adjust the focus of the camera to account for a difference in wavelength between visible and infrared light, wherein the actuating comprises moving the focus motor to a position comprising a base value and an offset value, and wherein the base value is determined in accordance with a curve relating focus motor position and a wavelength of infrared light, and wherein the curve is determined for an object distance.

* * * * *